(12) United States Patent
Root

(10) Patent No.: US 7,561,042 B2
(45) Date of Patent: Jul. 14, 2009

(54) PORTAL BARRIER MOVEMENT ALARM

(75) Inventor: Steven D. Root, Lake Forest, CA (US)

(73) Assignee: Southern California Edison, Rosemead, CA (US)

( * ) Notice: Subject to any disclaimer, the term of this patent is extended or adjusted under 35 U.S.C. 154(b) by 243 days.

(21) Appl. No.: 11/533,685

(22) Filed: Sep. 20, 2006

(65) Prior Publication Data

US 2008/0066554 A1 Mar. 20, 2008

(51) Int. Cl.
*G08B 13/08* (2006.01)

(52) U.S. Cl. .................. 340/545.1; 49/13; 116/86; 160/23.1; 160/88

(58) Field of Classification Search .............. 340/545.3, 340/545.5, 545.6, 545.7, 545.8, 545.9; 116/86; 49/13; 160/10, 23.1, 88, 98
See application file for complete search history.

(56) References Cited

U.S. PATENT DOCUMENTS

| 211,556 | A | | 1/1879 | Crosby |
| 945,946 | A | | 1/1910 | Helquist |
| 2,912,956 | A | | 11/1959 | Biernacki |
| 3,451,373 | A | | 6/1969 | Fox et al. |
| 4,005,397 | A | | 1/1977 | Blair |
| 4,062,314 | A | | 12/1977 | Allen et al. |
| 4,094,266 | A | | 6/1978 | Artt |
| 4,097,025 | A | * | 6/1978 | Dettmann et al. ............. 256/1 |
| 4,222,042 | A | * | 9/1980 | Cantley ...................... 340/546 |
| 4,533,904 | A | * | 8/1985 | Steinman, Jr. .............. 340/521 |
| 4,567,846 | A | | 2/1986 | Kurtz |
| 4,941,424 | A | | 7/1990 | Hanft |
| 4,978,943 | A | | 12/1990 | Mainiero et al. |
| 5,194,848 | A | | 3/1993 | Kerr |
| 5,489,890 | A | * | 2/1996 | Moser ........................ 340/546 |
| 6,967,584 | B2 | | 11/2005 | Maki |
| 6,980,108 | B1 | | 12/2005 | Gebbia et al. |
| 7,151,463 | B2 | * | 12/2006 | Hsu ......................... 340/693.5 |
| 2005/0002017 | A1 | | 1/2005 | Haran |
| 2005/0276611 | A1 | | 12/2005 | Patel et al. |
| 2007/0052538 | A1 | * | 3/2007 | Sakai ....................... 340/545.1 |
| 2007/0107852 | A1 | * | 5/2007 | Gordon ...................... 160/23.1 |

* cited by examiner

*Primary Examiner*—Davetta W Goins
*Assistant Examiner*—Edny Labbees
(74) *Attorney, Agent, or Firm*—Sheldon Mak Rose & Anderson PC; Denton L. Anderson

(57) ABSTRACT

A portal barrier movement alarm includes an apparatus having (a) a first assembly adapted for attachment to the moveable portal barrier; (b) a second assembly adapted for attachment spaced apart from but proximate to the moveable portal barrier; (c) and a vibration inducing ridge and a vibratable prong, the vibratable prong having a vibratable free end, one of the vibration inducing ridge and the vibratable prong being attached to the first assembly and the other of the vibration inducing ridge and the vibratable prong being attached to the second assembly such that the movement of the first assembly with respect to the second assembly causes the vibratable prong to contact the vibration inducing ridge and to thereby cause the vibratable prong to vibrate.

23 Claims, 10 Drawing Sheets

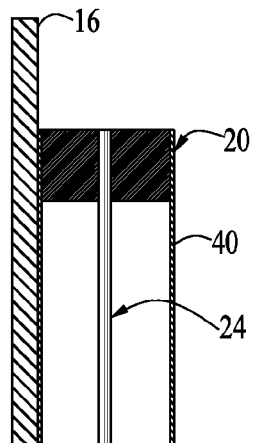
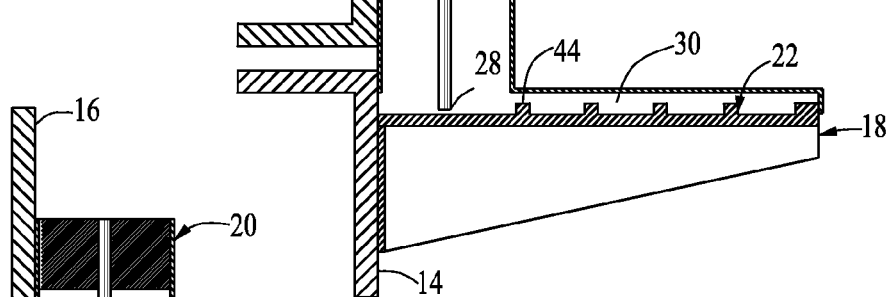
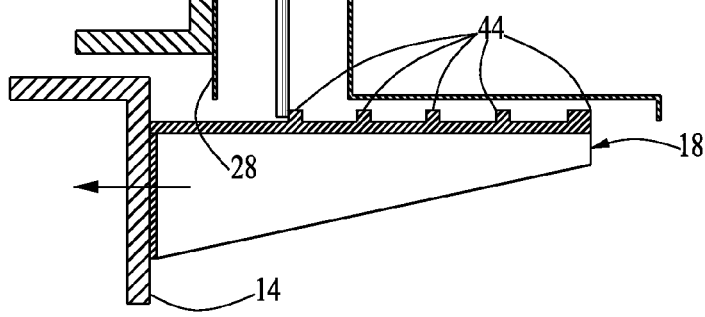

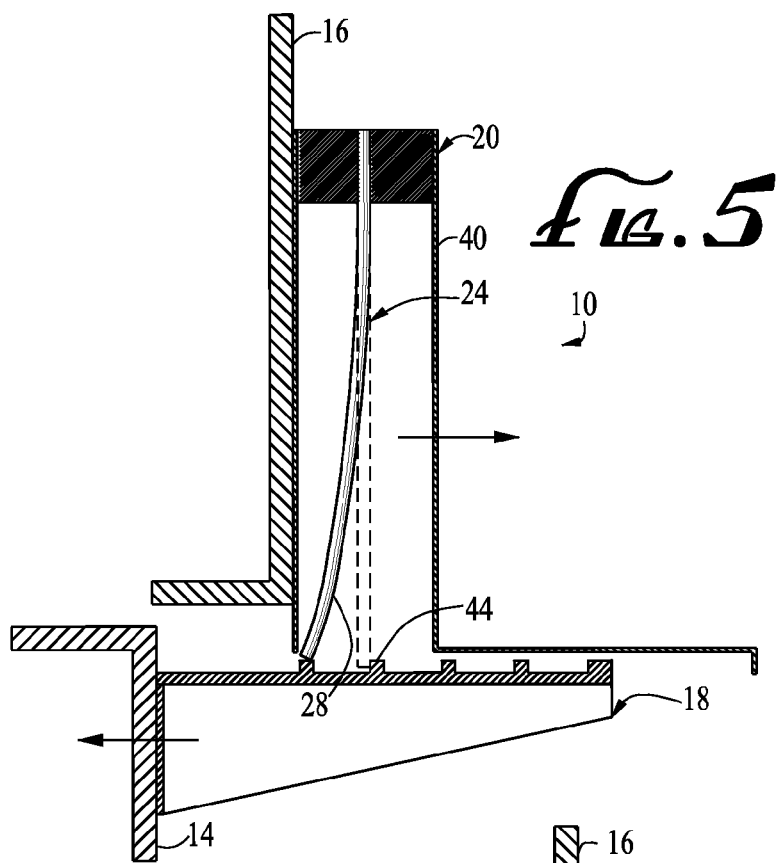
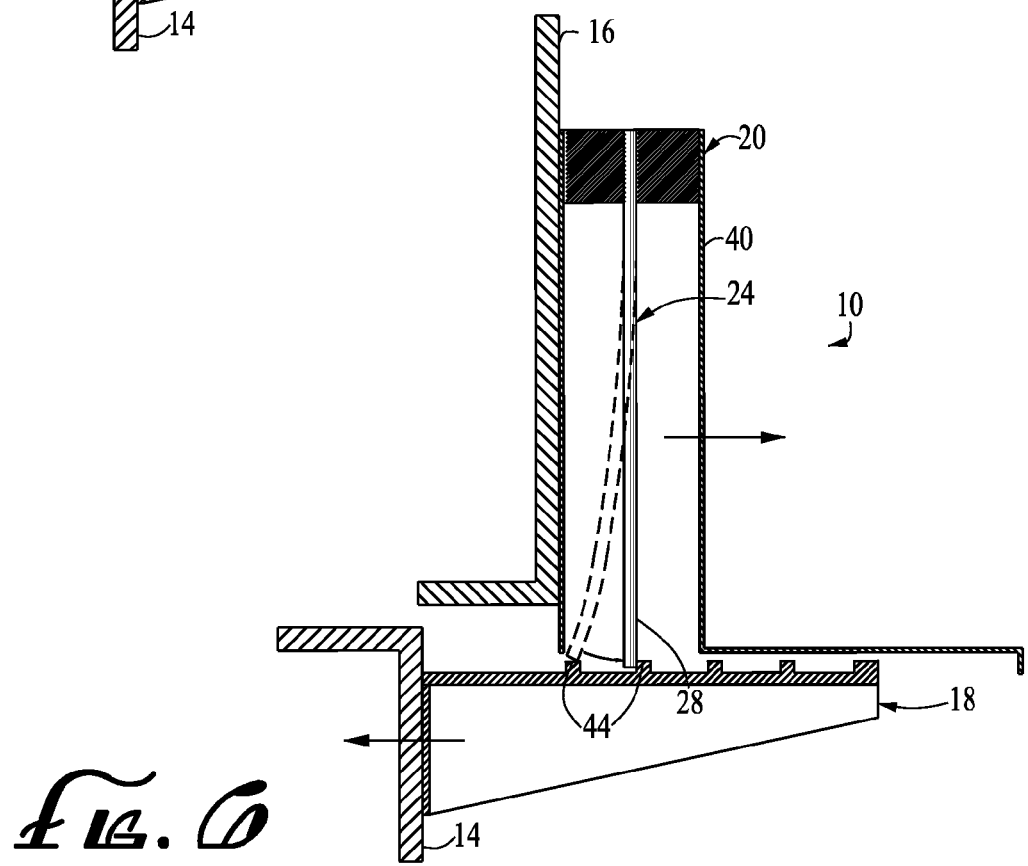

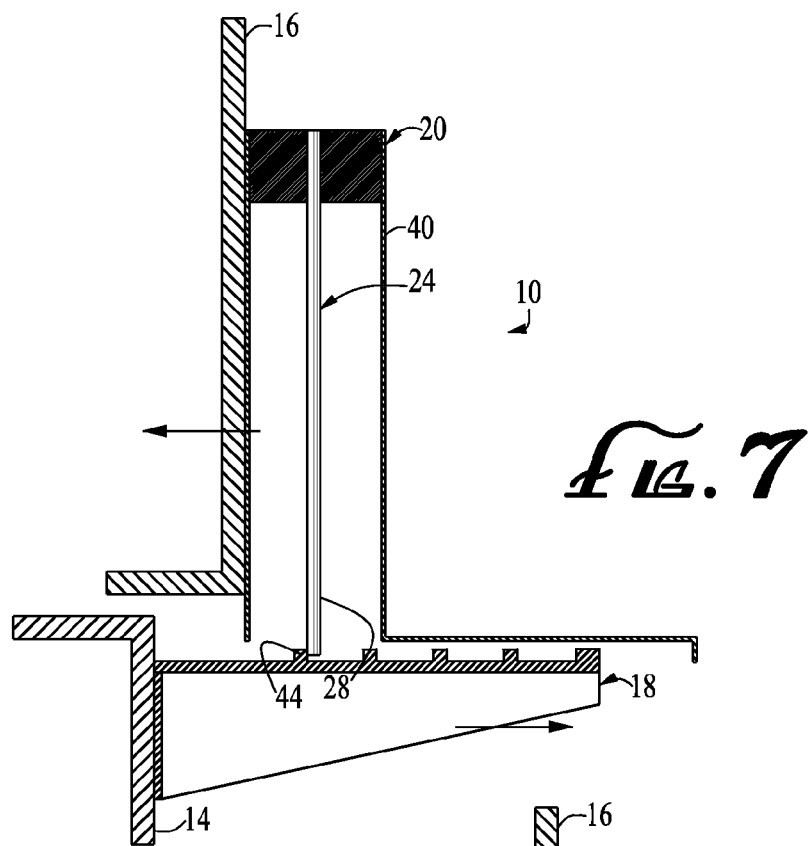
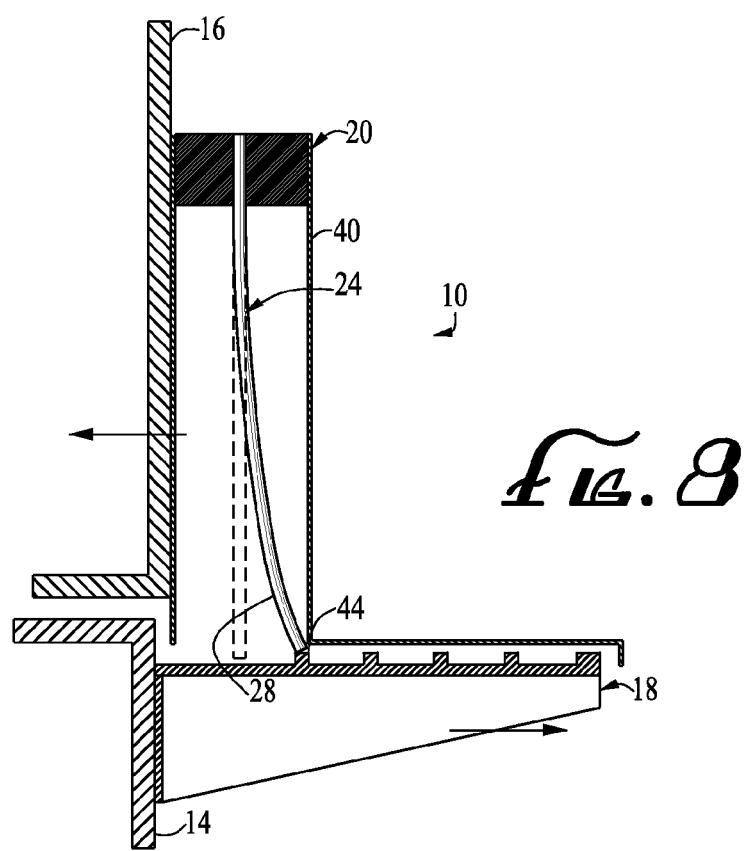

PORTAL BARRIER MOVEMENT ALARM

FIELD OF THE INVENTION

This invention relates generally to portal barrier movement alarms such as alarms activated by the movement of gates, doors, windows, hatches, etc.

BACKGROUND OF THE INVENTION

In many sectors of the national infrastructure, but most especially in critical sectors such as nuclear power, alarm systems which detect the breaching of a perimeter fence, wall or other barrier must be promptly and reliably detected.

Many such alarm systems are known in the prior art but most suffer from one or more of the following problems:

(1) they rely on vibration sensors tuned specifically to detect cutting or climbing of fence fabric, and are thus unreliable to detect the opening of gates or doors in the fence;

(2) they rely on additional sensors (e.g., position switches, infrared beams, microwave beams, etc.);

(3) the opening of a portal within the barrier does not create a vibration sufficiently strong to reliably trigger a vibration detector;

(4) the vibration is set off by a breach of sufficient magnitude to threaten the vibration sensors with damage;

(5) the devices are not passive in nature and cannot create detectable disturbances from the energy of a portal breach alone;

(6) the devices increase the force required to open the portal barrier beyond the limits of applicable building codes;

(7) the devices are unreliable when the portal barrier is opened very slowly or very rapidly;

(8) the devices are not self-resetting on closure of the portal barrier;

(9) the devices actually prevent the reclosure of an otherwise self-closing portal barrier;

(10) the devices rely solely upon a single disturbance which may or may not be detectable;

(11) the devices rely on detectable disturbances which do not necessarily occur within the first six inches or so of portal barrier motion;

(12) the devices rely on vibratable elements having a bending stress greater than the yield stress of one or more elements, therefore risking damage to the device;

(13) the devices are unduly large; and

(14) the devices are susceptible to tampering.

Accordingly, there is a need for a portal entry security device which avoids the aforementioned problems in the prior art.

SUMMARY

The invention satisfies this need. In one sense, the invention is an apparatus suitable for use with a vibration sensor to sense the opening of a moveable portal barrier. The apparatus comprises (a) a first assembly adapted for attachment to the moveable portal barrier; (b) a second assembly adapted for attachment spaced apart from but proximate to the moveable portal barrier; (c) and a vibration inducing ridge and a vibratable prong, the vibratable prong having a vibratable free end, one of the vibration inducing ridge and the vibratable prong being attached to the first assembly and the other of the vibration inducing ridge and the vibratable prong being attached to the second assembly such that the movement of the first assembly with respect to the second assembly causes the vibratable prong to contact the vibration inducing ridge and to thereby cause the vibratable prong to vibrate. In the invention, the first assembly is alternatively moveable between (i) a closed position wherein the first assembly and the second assembly are proximate to one another and cooperate together to enclose the vibratable end of the vibratable prong and the vibration inducing ridge and (ii) an open position wherein the first assembly is spaced further apart from the second assembly.

In another aspect of the invention, the invention is a method for sensing the opening of a movable portal barrier. The method comprises the steps of (a) providing an apparatus having: i) a first assembly adapted for attachment to the moveable portal barrier; ii) a second assembly adapted for attachment spaced apart but proximate to the moveable portal barrier; and iii) a vibration inducing ridge and a vibratable prong, the vibratable prong having a vibratable free end, one of the vibration inducing ridge and the vibratable prong being attached to the first assembly and the other of the vibration inducing ridge and the vibratable prong being attached to the second assembly such that the movement of the first assembly with respect to the second assembly causes the vibratable prong to contact the vibration inducing ridge and to thereby mechanically cause the vibratable prong to vibrate wherein the first assembly is alternatively moveable between (1) a closed position; (b) attaching the first assembly to the moveable portal barrier; (c) attaching the second assembly spaced apart from but proximate to the moveable portal barrier such that the first assembly and the second assembly are proximate to one another and cooperate together to enclose the vibratable end of the vibratable prong and the vibration inducing ridge and (2) an open position wherein the first assembly is spaced further apart from the second assembly; (d) disposing a vibration sensor in sufficiently close proximity to the apparatus so that the vibration sensor is capable of sensing vibrations in the vibratable prong when the first assembly is moved from the closed position to the open position; and (e) sensing the opening of the moveable portal barrier by sensing the vibration mechanically induced in the vibratable prong when the first assembly is moved from the closed position to the open position.

DRAWINGS

These and other features, aspects and advantages of the present invention will become better understood with reference to the following description, appended claims and accompanying drawings where:

FIG. 3 is a first cross-sectional side view of the apparatus illustrated in FIG. 2;

FIG. 4 is a second cross-sectional side view of the apparatus illustrated in FIG. 2;

FIG. 5 is a third cross-sectional side view of the apparatus illustrated in FIG. 2;

FIG. 6 is a fourth cross-sectional side view of the apparatus illustrated in FIG. 2;

FIG. 7 is a fifth cross-sectional side view of the apparatus illustrated in FIG. 2;

FIG. 8 is a sixth cross-sectional side view of the apparatus illustrated in FIG. 2;

DETAILED DESCRIPTION

Figure 1:
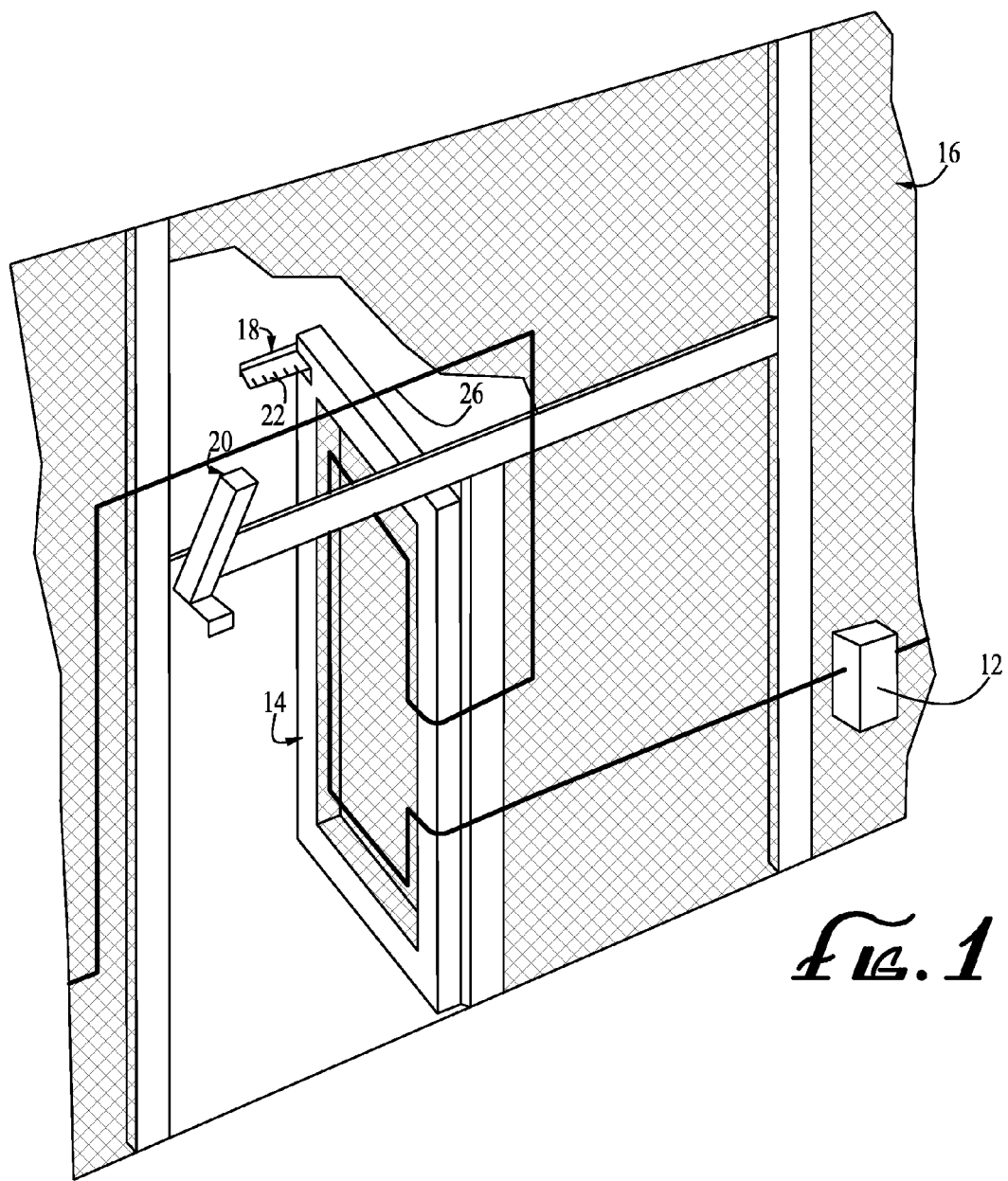
FIG. 1 is a perspective view of a first portal and movable portal barrier employing an apparatus and a method of the invention.
Figure 2:
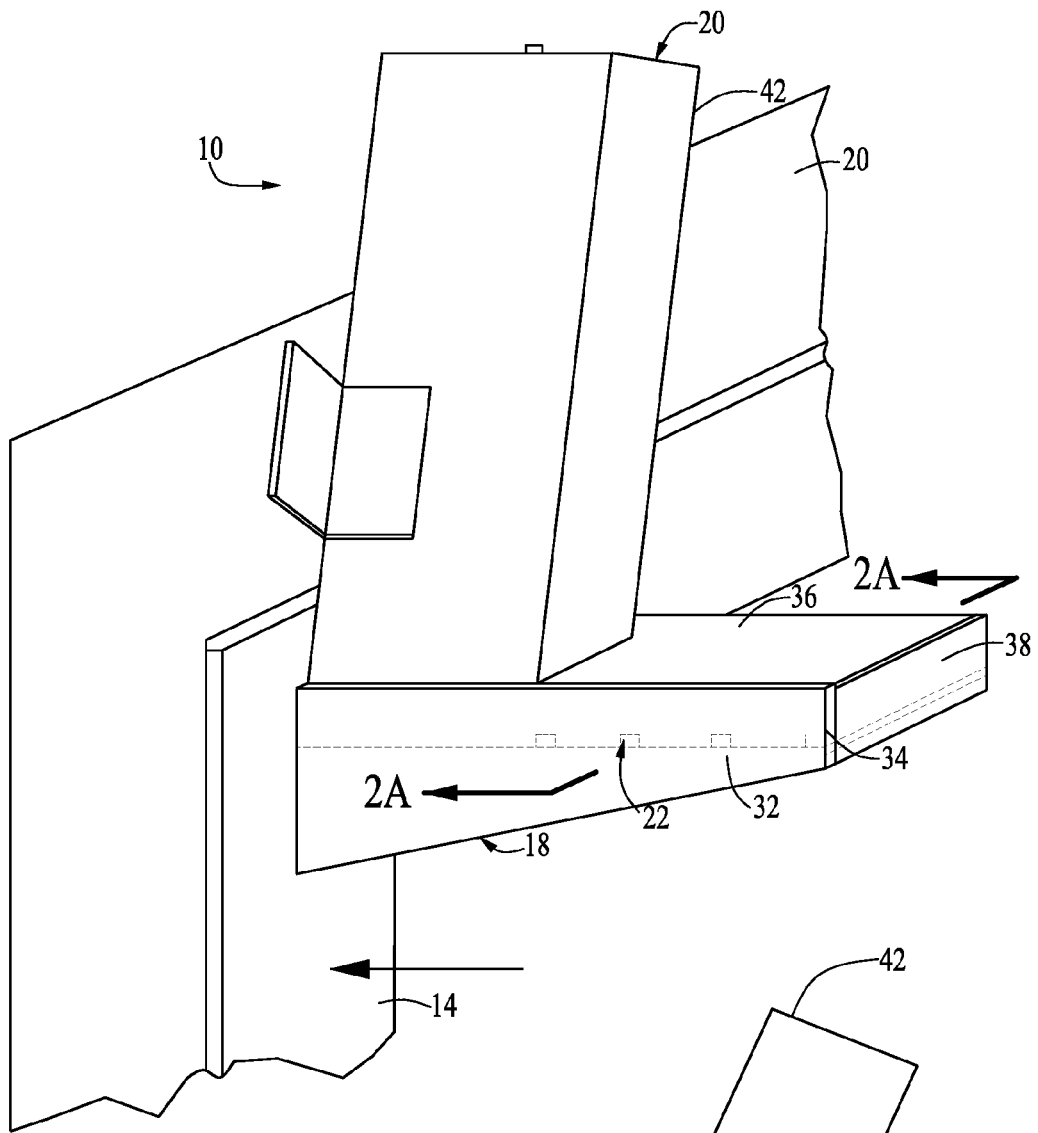
FIG. 2 is a perspective view of a first embodiment of an apparatus having features of the invention.
Figure 2A:
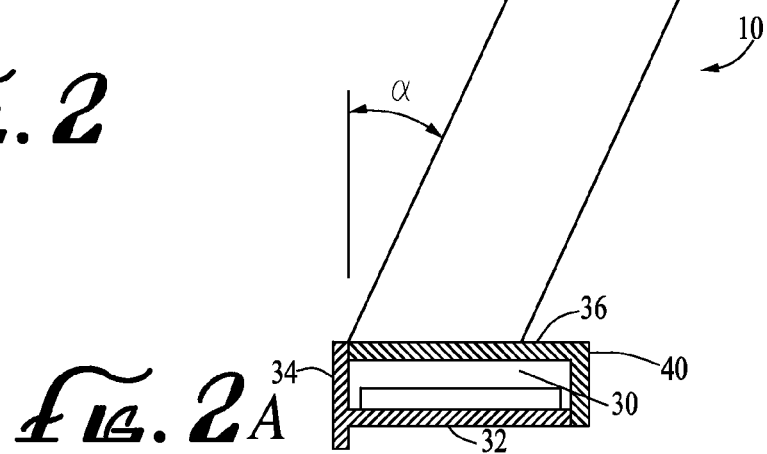
FIG. 2A is a cross-sectional end view of the apparatus illustrated in FIG. 2, taken along line 2A-2A.

The following discussion describes in detail one embodiment of the invention and several variations of that embodiment. This discussion should not be construed, however, as limiting the invention to those particular embodiments. Practitioners skilled in the art will recognize numerous other embodiments as well.

In one sense, the invention is an apparatus 10 suitable for use with a vibration sensor 26 to sense the opening of a movable portal barrier 14 in a fixed barrier 16. The apparatus 10 comprises a first assembly 18, a second assembly 20, a vibration inducing ridge 22 and a vibratable prong 24.

Figure 10:
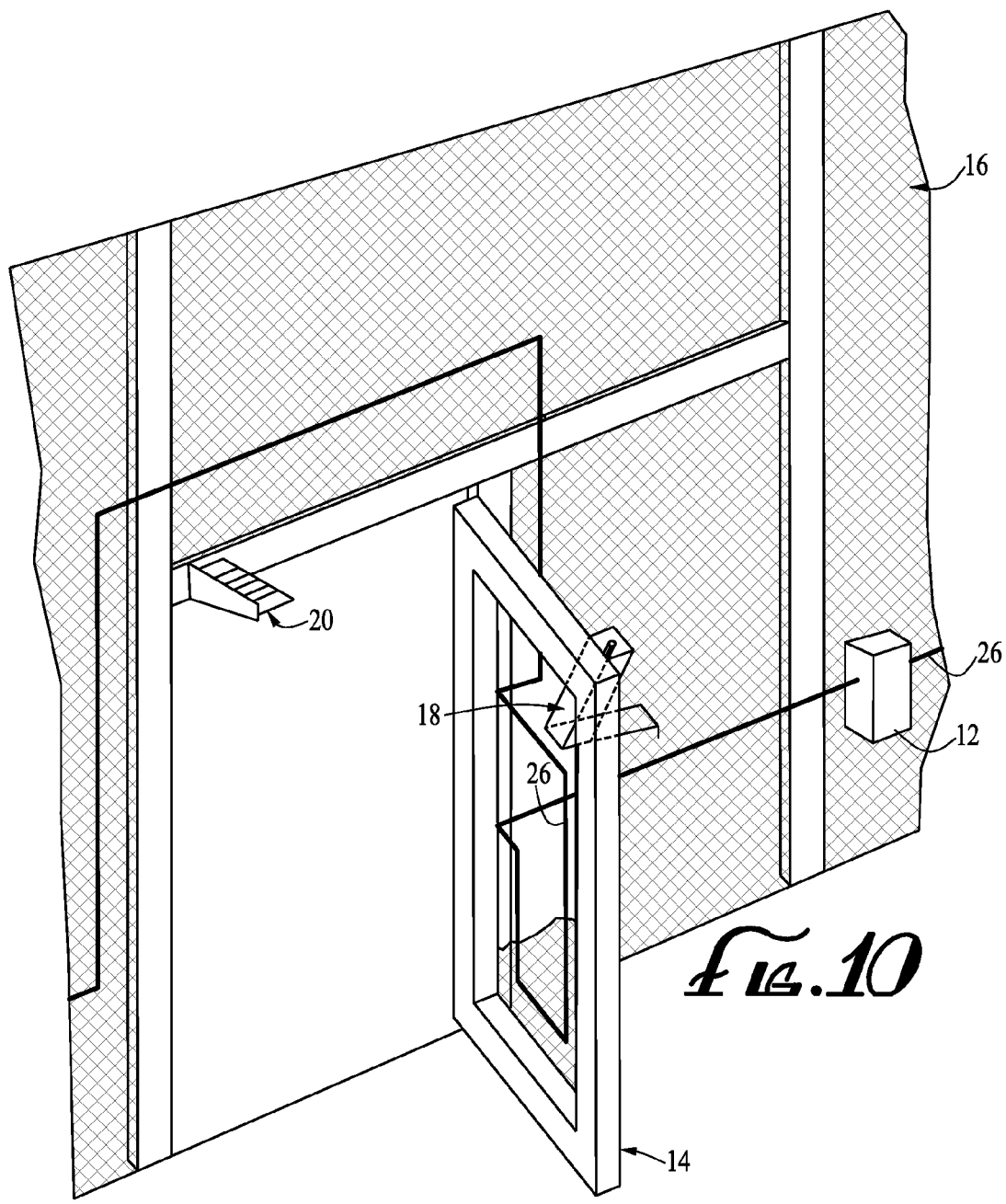
FIG. 10 is a perspective view of a second portal and movable portal barrier employing an apparatus and a method of the invention.
Figure 11:
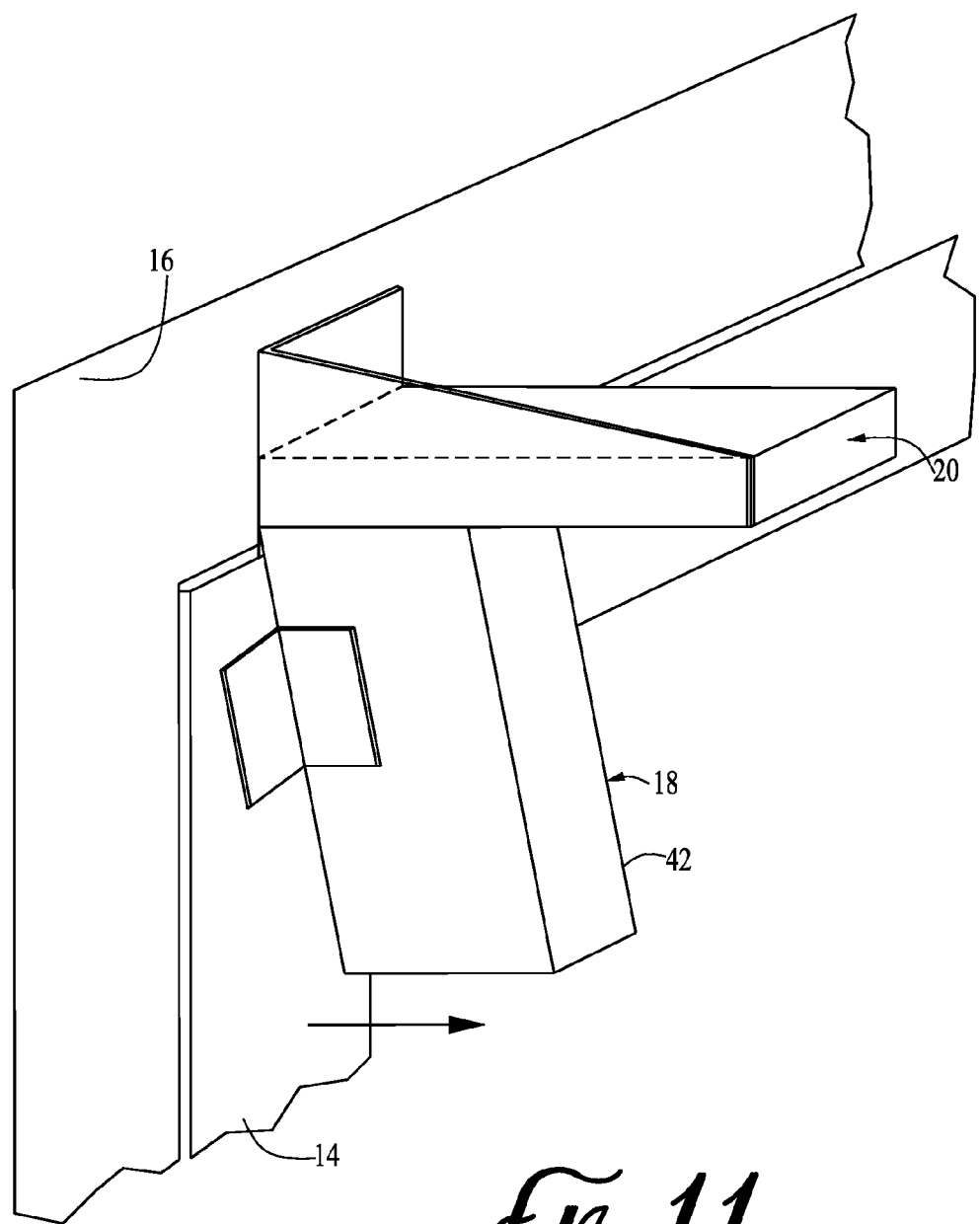
FIG. 11 is a perspective view of a second embodiment of an apparatus having features of the invention.
Figure 12:
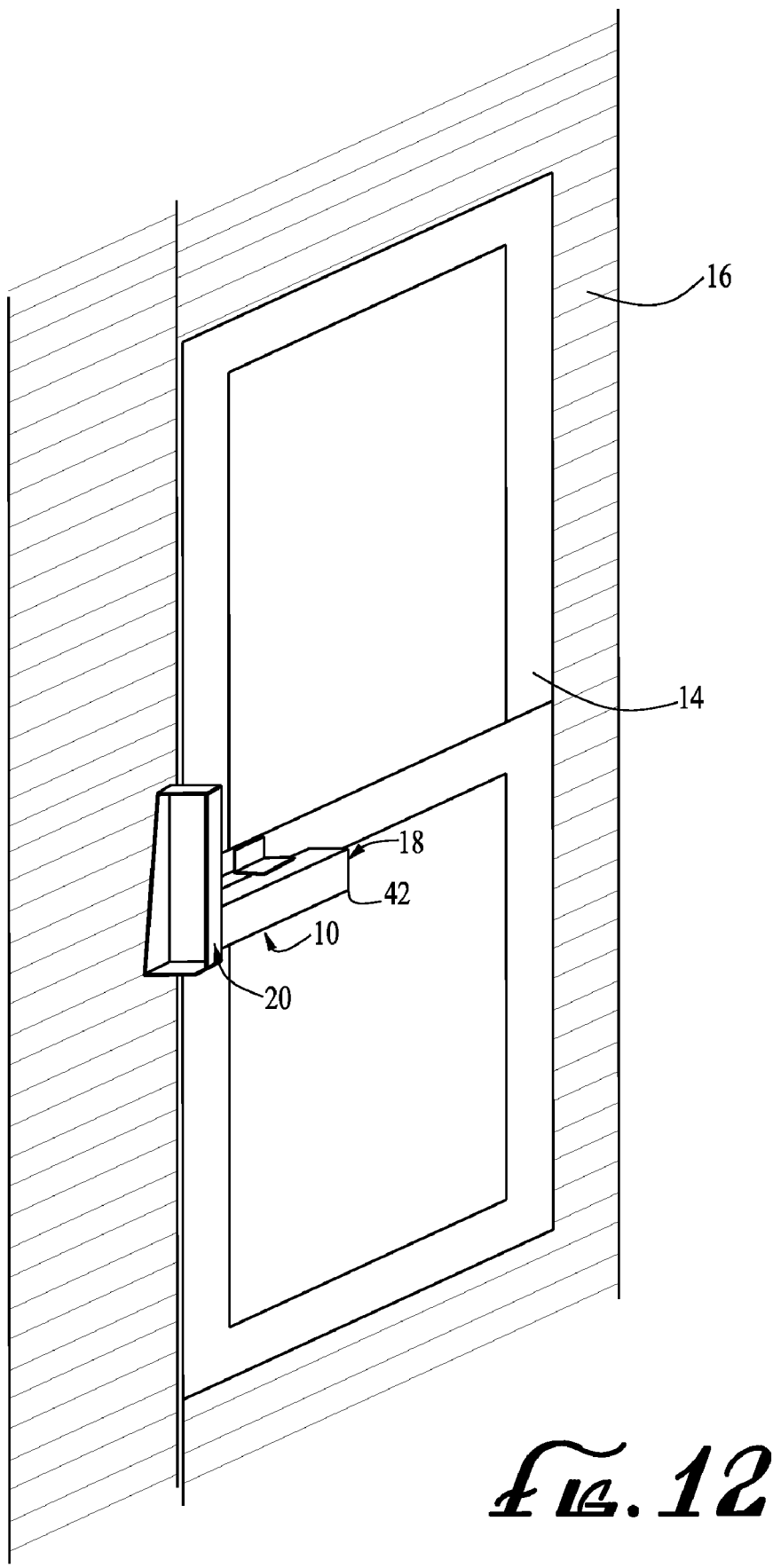
FIG. 12 is a perspective view of a third portal and movable portal barrier employing an apparatus of the invention.
Figure 13:
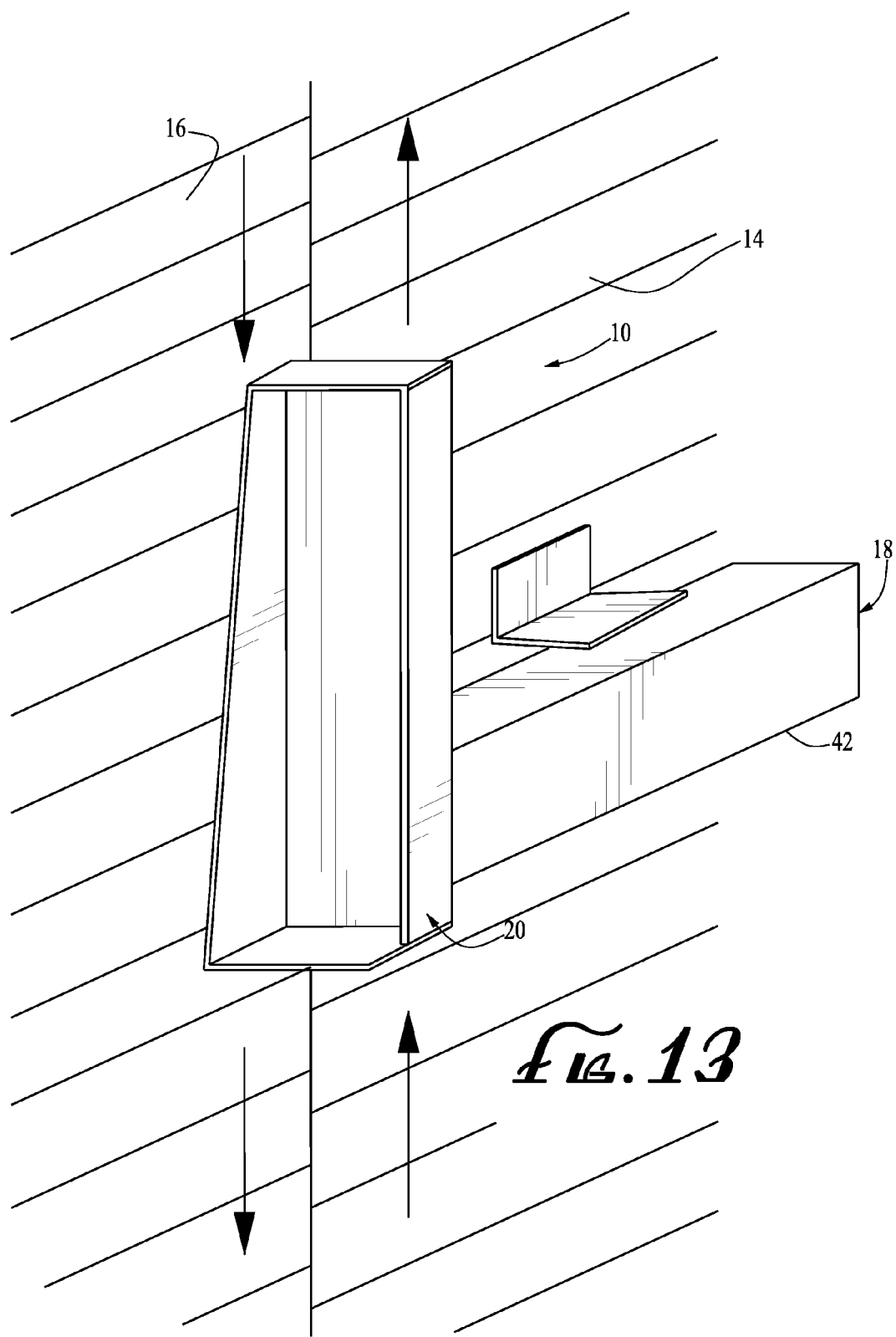
FIG. 13 is a perspective view of a third embodiment of an apparatus having features of the invention.

The fixed barrier 16 can be a wall, fence, floor, ceiling or any similar structure. The movable portal barrier 14 can be any device for closing a portal within the fixed barrier 16, such as a door, window, trap door, gate, hatch, etc. FIGS. 1-9 illustrate the apparatus 10 adapted to protect an outwardly opening movable portal barrier 14. FIGS. 10 and 11 illustrate the apparatus 10 adapted to protect an inwardly opening movable portal barrier 14. FIGS. 12 and 13 illustrate the apparatus 10 adapted to protect a movable portal barrier 14 which opens like a casement window by sliding up and down.

The first assembly 18 is adapted for attachment to the movable portal barrier 14, and the second assembly 20 is adapted for attachment spaced apart from, but proximate to, the movable portal barrier 14. In the embodiments illustrated in the drawings, the second assembly 20 is attached to the fixed barrier 16 proximate to the movable portal barrier 14.

In all cases, one of the vibration inducing ridge 22 and the vibratable prong 24 is attached to the first assembly 18 and the other of the vibration inducing ridge 22 and the vibratable prong 24 is attached to the second assembly 20. In the embodiments illustrated in FIGS. 1-9, the vibration inducing ridge 22 is attached to the first assembly 18 and the vibratable prong 24 is attached to the second assembly 20. In the embodiments illustrated in FIGS. 10-13, the vibration inducing ridge 22 is attached to the second assembly 20 and the vibratable prong 24 is attached to the first assembly 18.

The attachment of one of the vibration inducing ridge 22 and the vibratable prong 24 to the first assembly 18 and the attachment of the other of the vibration inducing ridge 22 and the vibratable prong 24 to the second assembly 20 is accomplished such that the movement of the first assembly 18 with respect to the second assembly 20 causes the vibratable prong 24 to contact the vibration inducing ridge 22 and to thereby mechanically cause the vibratable prong 24 to vibrate.

The first assembly 18 is alternatively movable between (i) a closed position wherein the first assembly 18 and the second assembly 20 are proximate to one another and cooperate together to enclose a vibratable end 28 of the vibratable prong 24 and the vibration inducing ridge 22, and (ii) an open position wherein the first assembly 18 is spaced apart from the second assembly 20.

The apparatus 10 is used with a vibration sensor 26 and electronics module 12 capable of sensing impulses created by the vibratable prong 24. Such a vibration sensor 26 is typically capable of sensing impulses with an energy between 1 inch-pound and 10 inch-pounds without sensor damage. Such vibration sensors 26 are available within the industry such as the MicroPoint Cable vibration sensor sold by Southwest Microwave of Tempe, Ariz., and the Intelli-Flex vibration sensor sold by Senstar Stellar of Ottawa, Canada. The vibration sensor 26 is typically set up within the perimeter provided by the fixed barrier 16. FIGS. 1 and 10 illustrate a typical installation wherein the vibration sensor 26 is attached on the interior of a perimeter fence. The vibration sensor 26 is shown as a vibration sensing cable disposed about the interior of the fence, and connected to the electronics module 12. In some applications, the vibration sensor 26 can alternatively be disposed about the exterior of the fence.

In the embodiment illustrated in the drawings, the first assembly 18 and the second assembly 20 cooperate together to enclose a vibratable end 28 of the vibratable prong 24 and the vibration inducing ridge 22 by forming an enclosure 30. This is a very important feature of the invention. The fact that the vibratable end 28 of the vibratable prong 24 and the vibration inducing ridge 22 are enclosed means that the apparatus 10 is largely "tamper-proof." For this reason, the first assembly 18 and the second assembly 20 are typically made from steel. In the embodiments illustrated in FIGS. 1-9, the enclosure 30 comprises a first assembly lower plate 32, a first assembly side flange 34, a second assembly upper plate 36, a second assembly end flange 38 and a second assembly side flange 40. The enclosure 30 is completed on its rear end by the movable portal barrier 14 (as illustrated in the embodiments of FIGS. 1-9) or by the fixed barrier 16 (as illustrated in the embodiments of FIGS. 10-13).

As illustrated in FIGS. 3-9, the second assembly 20 can comprise a housing 42 with the vibratable prong 24 cantilevered from within the housing 42 and with a vibratable end 28 of the vibratable prong 24 disposed outside of the housing 42.

The vibratable prong 24 can comprise a generally linear metal wire. The metal wire can be a steel wire and have a length between about 10.5 inches and about 11 inches and a generally circular cross-section with a diameter between about ⅛ inch and about ¼ inch. A length of steel piano wire is a preferred material because of its high yield strength, low damping characteristics and corrosion resistance.

Other materials, lengths and diameters can also be used. Table A illustrates lengths and diameters believed to be acceptable in the invention for typical industrially available vibration sensors where the material of the vibratable prong 24 is a high modulus material such as a steel or nickel alloy:

TABLE A

| L (in) | d (in) > 0.109 | 0.125 | 0.156 | 0.188 | 0.219 | 0.250 | 0.281 | 0.313 | 0.344 |
|---|---|---|---|---|---|---|---|---|---|
| 8.00 | no | no | no | no | no | no | no | no | no |
| 8.25 | no | no | no | no | no | no | no | no | no |
| 8.50 | no | no | no | no | no | no | no | no | no |
| 8.75 | no | no | no | no | no | no | no | no | no |
| 9.00 | no | no | no | no | no | no | no | no | no |
| 9.25 | no | no | no | no | no | no | no | no | no |
| 9.50 | no | no | no | no | no | no | no | no | no |
| 9.75 | no | no | no | YES | no | no | no | no | no |
| 10.00 | no | no | no | YES | no | no | no | no | no |
| 10.25 | no | no | no | YES | no | no | no | no | no |
| 10.50 | no | no | no | YES | no | no | no | no | no |
| 10.75 | no | no | no | YES | YES | no | no | no | no |

TABLE A-continued

| L (in) | 0.109 | 0.125 | 0.156 | 0.188 | 0.219 | 0.250 | 0.281 | 0.313 | 0.344 |
|---|---|---|---|---|---|---|---|---|---|
| 11.00 | no | no | no | YES | YES | no | no | no | no |
| 11.25 | no | no | no | YES | YES | no | no | no | no |
| 11.50 | no | no | no | YES | YES | no | no | no | no |
| 11.75 | no | no | no | YES | YES | no | no | no | no |
| 12.00 | no | no | no | YES | YES | no | no | no | no |
| 12.25 | no | no | no | YES | YES | YES | no | no | no |
| 12.50 | no | no | no | no | YES | YES | no | no | no |
| 12.75 | no | no | no | no | YES | YES | no | no | no |
| 13.00 | no | no | no | no | YES | YES | no | no | no |
| 13.25 | no | no | no | no | YES | YES | no | no | no |
| 13.50 | no | no | no | no | YES | YES | no | no | no |
| 13.75 | no | no | no | no | YES | YES | no | no | no |
| 14.00 | no | no | no | no | YES | YES | no | no | no |
| 14.25 | no | no | no | no | YES | YES | no | no | no |
| 14.50 | no | no | no | no | YES | YES | no | no | no |
| 14.75 | no | no | no | no | YES | YES | no | no | no |
| 15.00 | no | no | no | no | YES | YES | no | no | no |

Table B illustrates lengths and diameters believed acceptable in the invention for typical industrially available vibration sensors where the material of the vibratable prong 24 is a low modulus metal, such as alloys of aluminum, magnesium, copper and titanium:

TABLE B

| L (in) | 0.109 | 0.125 | 0.156 | 0.188 | 0.219 | 0.250 | 0.281 | 0.313 | 0.344 |
|---|---|---|---|---|---|---|---|---|---|
| 8.00 | no | no | no | no | no | no | no | no | no |
| 8.25 | no | no | no | no | no | no | no | no | no |
| 8.50 | no | no | no | YES | no | no | no | no | no |
| 8.75 | no | no | no | YES | no | no | no | no | no |
| 9.00 | no | no | no | YES | no | no | no | no | no |
| 9.25 | no | no | no | YES | YES | no | no | no | no |
| 9.50 | no | no | no | YES | YES | no | no | no | no |
| 9.75 | no | no | no | YES | YES | no | no | no | no |
| 10.00 | no | no | no | YES | YES | no | no | no | no |
| 10.25 | no | no | no | YES | YES | no | no | no | no |
| 10.50 | no | no | no | YES | YES | no | no | no | no |
| 10.75 | no | no | no | YES | YES | YES | no | no | no |
| 11.00 | no | no | no | YES | YES | YES | no | no | no |
| 11.25 | no | no | no | no | YES | YES | no | no | no |
| 11.50 | no | no | no | no | YES | YES | no | no | no |
| 11.75 | no | no | no | no | YES | YES | no | no | no |
| 12.00 | no | no | no | no | YES | YES | no | no | no |
| 12.25 | no | no | no | no | YES | YES | no | no | no |
| 12.50 | no | no | no | no | YES | YES | no | no | no |
| 12.75 | no | no | no | no | YES | YES | no | no | no |
| 13.00 | no | no | no | no | YES | YES | no | no | no |
| 13.25 | no | no | no | no | YES | YES | no | no | no |
| 13.50 | no | no | no | no | YES | YES | no | no | no |
| 13.75 | no | no | no | no | YES | YES | YES | no | no |
| 14.00 | no | no | no | no | YES | YES | YES | no | no |
| 14.25 | no | no | no | no | YES | YES | YES | no | no |
| 14.50 | no | no | no | no | YES | YES | YES | no | no |
| 14.75 | no | no | no | no | YES | YES | YES | no | no |
| 15.00 | no | no | no | no | YES | YES | YES | no | no |

Table C illustrates lengths and diameters believed acceptable in the invention for typical industrially available vibration sensors where the material of the vibratable prong 24 is a reenforced plastic, such as carbon fiber reenforced liquid crystal polymers:

TABLE C

| L (in) | 0.156 | 0.188 | 0.219 | 0.250 | 0.281 | 0.313 | 0.344 | 0.375 | 0.406 | 0.4375 |
|---|---|---|---|---|---|---|---|---|---|---|
| 8.00 | no | no | no | no | no | no | no | no | no | no |
| 8.25 | no | no | no | no | no | no | no | no | no | no |
| 8.50 | no | no | no | YES | no | no | no | no | no | no |
| 8.75 | no | no | no | YES | no | no | no | no | no | no |
| 9.00 | no | no | no | YES | no | no | no | no | no | no |
| 9.25 | no | no | no | YES | YES | no | no | no | no | no |
| 9.50 | no | no | no | YES | YES | no | no | no | no | no |
| 9.75 | no | no | no | YES | YES | YES | no | no | no | no |
| 10.00 | no | no | no | YES | YES | YES | no | no | no | no |
| 10.25 | no | no | no | YES | YES | YES | no | no | no | no |
| 10.50 | no | no | no | no | YES | YES | no | no | no | no |
| 10.75 | no | no | no | no | YES | YES | no | no | no | no |
| 11.00 | no | no | no | no | YES | YES | YES | no | no | no |
| 11.25 | no | no | no | no | YES | YES | YES | no | no | no |
| 11.50 | no | no | no | no | YES | YES | YES | no | no | no |
| 11.75 | no | no | no | no | YES | YES | YES | no | no | no |
| 12.00 | no | no | no | no | YES | YES | YES | no | no | no |
| 12.25 | no | no | no | no | YES | YES | YES | no | no | no |
| 12.50 | no | no | no | no | YES | YES | YES | no | no | no |
| 12.75 | no | no | no | no | YES | YES | YES | no | no | no |
| 13.00 | no | no | no | no | YES | YES | YES | YES | no | no |
| 13.25 | no | no | no | no | no | YES | YES | YES | no | no |
| 13.50 | no | no | no | no | no | YES | YES | YES | no | no |
| 13.75 | no | no | no | no | no | YES | YES | YES | no | no |
| 14.00 | no | no | no | no | no | YES | YES | YES | no | no |
| 14.25 | no | no | no | no | no | YES | YES | YES | no | no |
| 14.50 | no | no | no | no | no | YES | YES | YES | no | no |
| 14.75 | no | no | no | no | no | YES | YES | YES | no | no |
| 15.00 | no | no | no | no | no | YES | YES | YES | no | no |

The vibration inducing ridge 22 comprises at least one vibration inducing edge 44. Preferably, the at least one vibration inducing edge 44 has a height of at least about ⅛ inch. Such a vibration inducing ridge 22 has sufficient height to remain operable even when the first assembly 18 and the second assembly 20 are disposed out of alignment.

Preferably, the vibration inducing ridge 22 comprises a plurality of vibration inducing edges 44. A plurality of vibration inducing edges 44 results in a plurality of mechanically induced impulses as the vibratable prong 24 moves past each vibration inducing ridge 22 and the free end 28 impacts the next vibration inducing ridge 22, thereby maximizing the chances that the impulses will be detected by the vibration sensor 26 and recognized by the electronic module 12. In the embodiment illustrated in the drawings, the vibration inducing ridge 22 comprises five vibration inducing edges 44.

To allow reclosure of the movable portal barrier 14 without intervention, the vibratable prong 24 is preferably disposed at an angle α with respect to the vertical by approximately 5°-15°, typically about 10°. With this angular offset, the vibratable prong 24 will deflect out of the plane of actuation if the direction of the movable portal barrier 14 is reversed, thereby avoiding jamming of the vibratable prong 24.

Figure 9:
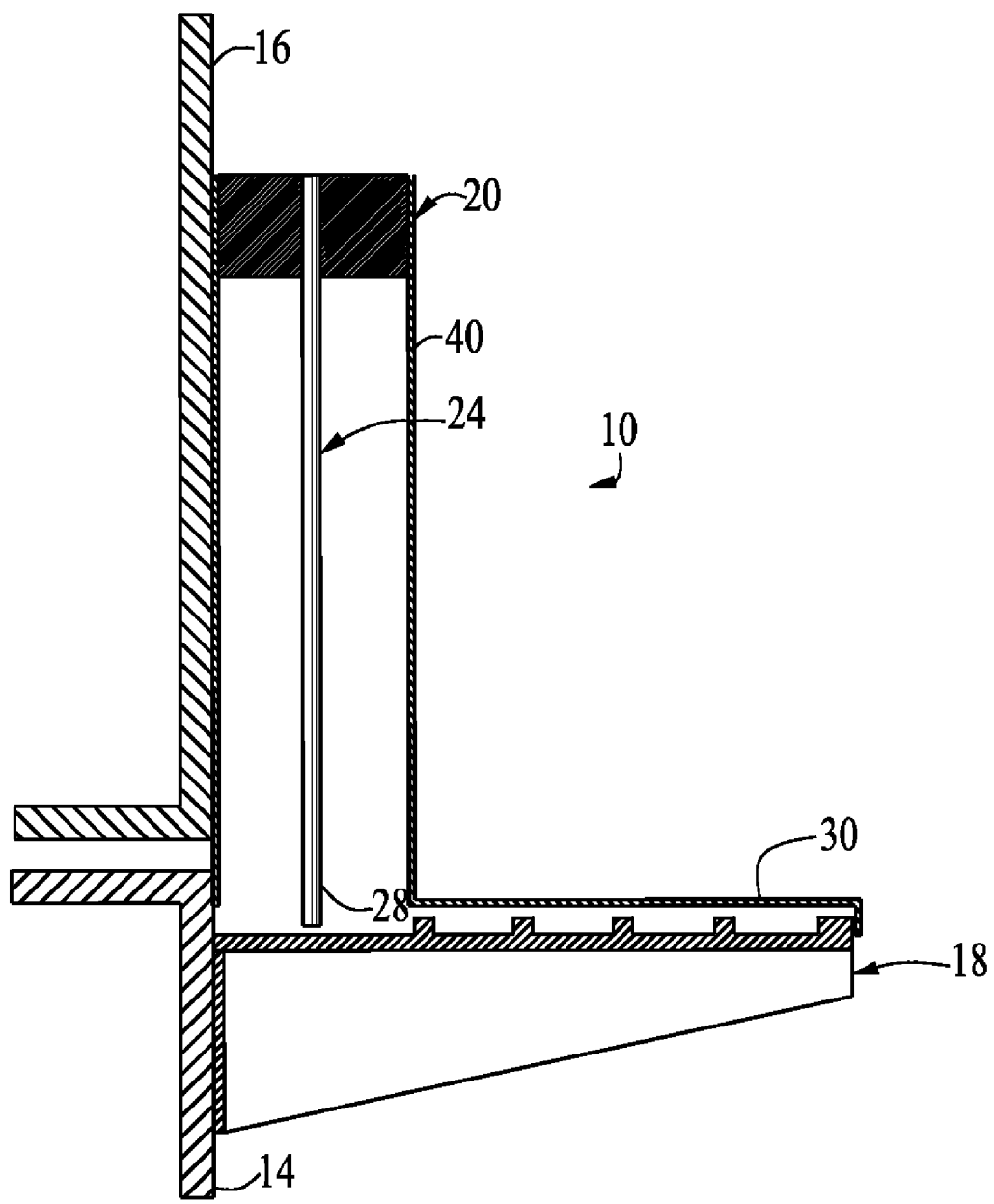
FIG. 9 is a seventh cross-sectional side view of the apparatus illustrated in FIG. 2.

FIGS. 3-9 illustrate the interaction of the vibratable prong 24 and the vibration inducing ridge 22. FIG. 3 illustrates the first assembly 18 in the closed position. FIG. 4 illustrates the movement of the first assembly 18 with respect to the second assembly 20 as the first assembly 18 is moved from the closed position towards the open position. In FIG. 4, the vibratable prong 24 is seen to be contacting the first of the five vibration inducing edges 44. FIGS. 5 and 6 illustrate the apparatus 10 as the first assembly 18 continues to move away from the second assembly 20 towards the open position. As the vibratable prong 24 passes the first vibration inducing edge 44, the free end 28 of the vibratable prong 24 snaps towards the second vibration inducing edge 44, thereby causing the vibratable prong 24 to impact the second vibration inducing edge 44 to mechanically create an impulse in the energy range suitable for the vibration sensor 26 and electronics module 12. FIGS. 7 and 8 illustrate the apparatus 10 as the first assembly 18 is moved towards the closed position. In FIG. 7, the vibratable prong 24 has contacted the first vibration inducing edge 44. As the vibratable prong 24 snaps past the first vibration inducing edge 44, the vibratable prong 24 again mechanically vibrates. FIG. 9 illustrates the apparatus 10 when the first assembly 18 has returned to the closed position.

In the embodiment illustrated in the drawings, one of the vibration inducing ridge 22 and the vibratable prong 24 is attached to the first assembly 18 and the other of the vibration inducing ridge 22 and the vibratable prong 24 is attached to the second assembly 20 such that the movement of the first assembly 18 from the closed position to the open position causes the vibratable prong 24 to mechanically contact the vibration inducing ridge 22 and to thereby cause the free end 28 of the vibratable prong 24 to mechanically create an impulse a plurality of times. As noted above, causing the free end 28 of the vibratable prong 24 to create an impulse a plurality of times gives additional assurance that the impulse created by the free end 28 of the vibratable prong 24 will be detected by the vibration sensor 26 and recognized by the electronic module 12.

Also in the embodiment illustrated in the drawings, one of the vibration inducing ridge 22 and the vibratable prong 24 is attached to the first assembly 18 and the other of the vibration inducing ridge 22 and the vibratable prong 24 is attached to the second assembly 20 such that the movement of the first assembly 18 from the closed position to the open position causes the vibratable prong 24 to contact the vibration inducing ridge 22 and to thereby cause the free end 28 of the vibratable prong 24 to mechanically create an impulse when the speed of the movement of the first assembly 18 between a closed position and the open position is as slow as about one inch per hour. Causing the free end 28 of the prong 24 to mechanically create an impulse even when the movable portal barrier 14 is opened very slowly assures that the vibration sensor 26 and electronic module 12 will recognize the opening of the movable portal barrier 14 regardless of the speed with which the movable portal barrier 14 is opened.

Still further in the embodiment illustrated in the drawings, one of the vibration inducing ridge 22 and the vibratable prong 24 is attached to the first assembly 18 and the other of the vibration inducing ridge 22 and the vibratable prong 24 is attached to the second assembly 20 such that the movement of the first assembly 18 from the closed position to the open position causes the vibratable prong 24 to contact the vibration inducing ridge 22 each time the first assembly 18 is moved from the closed position to the open position and to thereby cause the free end 28 of the vibratable prong 24 to mechanically create an impulse. Causing the free end 28 of the vibratable prong 24 to contact the vibration inducing ridge 22 each time the first assembly 18 is moved from the closed position to the open position assures that the vibration sensor 26 and electronic module 12 will recognize the opening of the movable portal barrier 14 without the apparatus 10 having to be "re-set" after each opening of the movable portal barrier 14.

The invention is also a method for sensing the opening of a movable portal barrier 14. The method comprises the steps of (a) providing an apparatus 10 having: i) a first assembly 18 adapted for attachment to the moveable portal barrier; ii) a second assembly 20 adapted for attachment spaced apart but proximate to the moveable portal barrier; and iii) a vibration inducing ridge 22 and a vibratable prong 24, the vibratable prong 24 having a vibratable end 28, one of the vibration inducing ridge 22 and the vibratable prong 24 being attached to the first assembly 18 and the other of the vibration inducing ridge 22 and the vibratable prong 24 being attached to the second assembly 20 such that the movement of the first assembly 18 with respect to the second assembly 20 causes the vibratable prong 24 to contact the vibration inducing ridge 22 and to thereby mechanically cause the vibratable prong 24 to vibrate wherein the first assembly 18 is alternatively moveable between (1) a closed position and (2) an open position wherein the first assembly 18 is spaced further apart from the second assembly 20; (b) attaching the first assembly 18 to the moveable portal barrier 14; (c) attaching the second assembly 20 spaced apart from but proximate to the moveable portal barrier 14 such that the first assembly 18 and the second assembly 20 are proximate to one another and cooperate together to enclose the vibratable end 28 of the vibratable prong 24 and the vibration inducing ridge 22; (d) disposing a vibration sensor 26 in sufficiently close proximity to the apparatus 10 so that the vibration sensor 26 is capable of sensing vibrations in the vibratable prong 24 when the first assembly 18 is moved from the closed position to the open position; and (e) sensing the opening of the moveable portal barrier by sensing the vibration mechanically induced in the vibratable prong 24 when the first assembly 18 is moved from the closed position to the open position.

The invention provides an apparatus and a method for effectively sensing the opening of a movable portal barrier which (i) creates disturbances large enough for typical, industrially available vibration sensors to detect, but small enough that any vibration-based perimeter alarm system will not be damaged; (ii) is passive in nature and creates detectible disturbances from the energy of movable portal barrier motion alone, in order to preclude the need for additional periodic readiness testing; (iii) does not increase the force required to open the portal beyond the limits of applicable building codes; (iv) creates detectible disturbances regardless of the speed that the movable portal barrier is opened, thereby providing protection against both dynamic and surreptitious entry; (v) is self-resetting on reclosure of the movable portal barrier, so that intervention at the movable portal barrier is not required to restore detection; (vi) does not prevent reclosure of a self-closing movable portal barrier, so that intervention at the movable portal barrier is not required to restore the perimeter; (vii) creates multiple detectable disturbances to maximize the reliability of detection; (viii) creates disturbances within the first six inches of portal motion in order to prevent undetected entry; (ix) employs bending stresses less than yield stresses, to ensure repeatable performance; (x) is relatively small so that it does not obstruct the use of the movable portal barrier; (xi) is protected against tampering; and (xii) is inexpensive and easy to construct and install.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. An alarm for the opening of a moveable portal barrier, the alarm comprising:
   (a) a first assembly adapted for attachment to the moveable portal barrier;
   (b) a second assembly adapted for attachment spaced apart from but proximate to the moveable portal barrier;
   (c) a vibration inducing ridge and a vibratable prong, the vibratable prong having a vibratable free end, one of the vibration inducing ridge and the vibratable prong being attached to the first assembly and the other of the vibration inducing ridge and the vibratable prong being attached to the second assembly such that the movement of the first assembly with respect to the second assembly causes the vibratable prong to contact and move relative to the vibration inducing ridge so that the ridge mechanically causes the vibratable prong to vibrate; and
   (d) a sensor for sending vibration of the prong;
   wherein the first assembly is alternatively moveable between (i) a closed position wherein the first assembly and the second assembly are proximate to one another and cooperate together to enclose the vibratable end of the vibratable prong and the vibration inducing ridge so that the alarm is largely tamper-proof and (ii) an open position wherein the first assembly is spaced further apart from the second assembly.

2. The alarm of claim 1 wherein the free end of the vibratable prong impacts a vibration inducing ridge to create an impulse.

3. The alarm of claim 1 wherein the vibratable prong comprises a generally linear metal wire.

4. The alarm of claim 1 wherein the second assembly comprises a housing with the vibratable prong cantilevered from within the housing and with the vibratable free end disposed outside of the housing.

5. The alarm of claim 3 wherein the vibratable prong comprises a generally linear metal wire.

6. The alarm of claim 5 wherein the metal wire is steel and has a length of between about 10.5 inches and about 11 inches.

7. The alarm of claim 3 wherein the metal wire is steel and has a generally circular cross section with a diameter between about 1/8 inch and about 1/4 inch.

8. The alarm of claim 1 wherein the vibration inducing ridge comprises a plurality of vibration inducing edges.

9. The alarm of claim 1 wherein one of the vibration inducing ridge and the vibratable prong is attached to the first assembly and the other of the vibration inducing ridge and the vibratable prong is attached to the second assembly such that the movement of the first assembly from the closed position to the open position causes the vibratable prong to contact the vibration inducing ridge and to thereby cause the vibratable prong to vibrate a plurality of times.

10. The alarm of claim 1 wherein one of the vibration inducing ridge and the vibratable prong is attached to the first assembly and the other of the vibration inducing ridge and the vibratable prong is attached to the second assembly such that the movement of the first assembly with respect to the second assembly causes the vibration prong to contact the vibration inducing ridge and to thereby cause the vibratable prong to vibrate when the speed of the movement of the first assembly between the closed position and the open position is less than about one inch per hour.

11. The alarm of claim 1 wherein one of the vibration inducing ridge and the vibratable prong is attached to the first assembly and the other of the vibration inducing ridge and the vibratable prong is attached to the second assembly such that the uninterrupted continuous movement of the first assembly with respect to the second assembly between the closed position and the open position, followed by movement of the first assembly with respect to the second assembly between the open position and the closed position, followed by movement of the first assembly with respect to the second assembly between the closed position and the open position causes the vibratable prong to contact the vibration inducing ridge each time the first assembly is moved from the closed position to the open position and to thereby cause the vibratable prong to vibrate.

12. The alarm of claim 1 wherein the vibration inducing ridge comprises at least one vibration inducing edge having a height of at least about 1/8 inch.

13. The alarm of claim 1 wherein the first assembly is attached to a moveable portal barrier and the second assembly is attached to a non-moveable barrier.

14. The alarm of claim 1 in combination with a vibration sensor capable of sensing vibrations in the vibratable prong when the first assembly is moved from the closed position to the open position.

15. The alarm of claim 1 in combination with a vibration sensor capable of sensing impulses created by impact of the free end of the vibratable prong when the first assembly is moved from the closed position to the open position.

16. A method for sensing the opening of a moveable portal barrier, the method comprising the steps of:
   (a) providing an apparatus having: i) a first assembly adapted for attachment to the moveable portal barrier; ii) a second assembly adapted for attachment spaced apart but proximate to the moveable portal barrier; and iii) a vibration inducing ridge and a vibratable prong, the vibratable prong having a vibratable free end, one of the vibration inducing ridge and the vibratable prong being attached to the first assembly and the other of the vibration inducing ridge and the vibratable prong being attached to the second assembly such that the movement of the first assembly with respect to the second assembly causes the vibratable prong to contact and move relative to the vibration inducing ridge so that the ridge mechanically causes the vibratable prong to vibrate, wherein the first assembly is alternatively moveable between i) a closed position and ii) an open position wherein the first assembly is spaced further apart from the second assembly;

(b) attaching the first assembly to the moveable portal barrier;

(c) attaching the second assembly spaced apart from but proximate to the moveable portal barrier such that the first assembly and the second assembly are proximate to one another and cooperate together to enclose the vibratable end of the vibratable prong and the vibration inducing ridge so that the alarm is largely tamper-proof;

(d) disposing a vibration sensor in sufficiently close proximity to the apparatus so that the vibration sensor is capable of sensing vibrations in the vibratable prong when the first assembly is moved from the closed position to the open position; and (e) sensing the opening of the moveable portal barrier by sensing the vibration mechanically induced in the vibratable prong when the first assembly is moved from the closed position to the open position.

17. The apparatus of claim 16 wherein the free end of the vibratable prong impacts a vibration inducing ridge to create an impulse.

18. The apparatus of claim 16 wherein the vibratable prong comprises a generally linear metal wire.

19. The apparatus of claim 16 wherein the second assembly comprises a housing with the vibratable prong cantilevered from within the housing and with the vibratable free end disposed outside of the housing.

20. The apparatus of claim 16 wherein one of the vibration inducing ridge and the vibratable prong is attached to the first assembly and the other of the vibration inducing ridge and the vibratable prong is attached to the second assembly such that the movement of the first assembly from the closed position to the open position causes the vibratable prong to contact the vibration inducing ridge and to thereby cause the vibratable prong to vibrate a plurality of times.

21. The apparatus of claim 16 wherein one of the vibration inducing ridge and the vibratable prong is attached to the first assembly and the other of the vibration inducing ridge and the vibratable prong is attached to the second assembly such that the movement of the first assembly with respect to the second assembly causes the vibration prong to contact the vibration inducing ridge and to thereby cause the vibratable prong to vibrate when the speed of the movement of the first assembly between the closed position and the open position is less than about one inch per hour.

22. The apparatus of claim 16 wherein one of the vibration inducing ridge and the vibratable prong is attached to the first assembly and the other of the vibration inducing ridge and the bottom vibratable prong is attached to the second assembly such that the uninterrupted continuous movement of the first assembly with respect to the second assembly between the closed position and the open position, followed by movement of the first assembly with respect to the second assembly between the open position and the closed position, followed by movement of the first assembly with respect to the second assembly between the closed position and the open position causes the vibratable prong to contact the vibration inducing ridge each time the first assembly is moved from the closed position to the open position and to thereby cause the vibratable prong to vibrate.

23. The alarm of claim 1 wherein the sensor is capable of sensing mechanical vibration impulses having an energy between 1 inch-pound and 10 inch-pounds.

* * * * *